M. G. WILDER.
Pressure-Regulator.
No. 220,202.                   Patented Sept. 30, 1879.
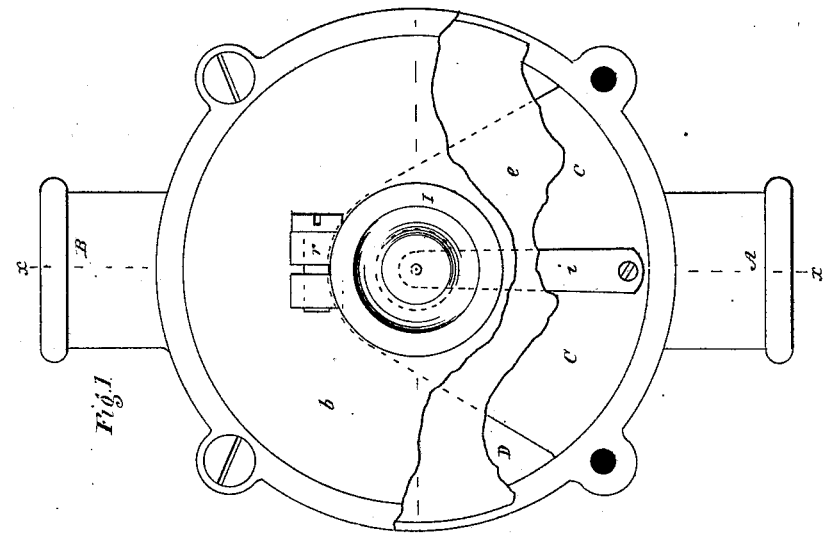
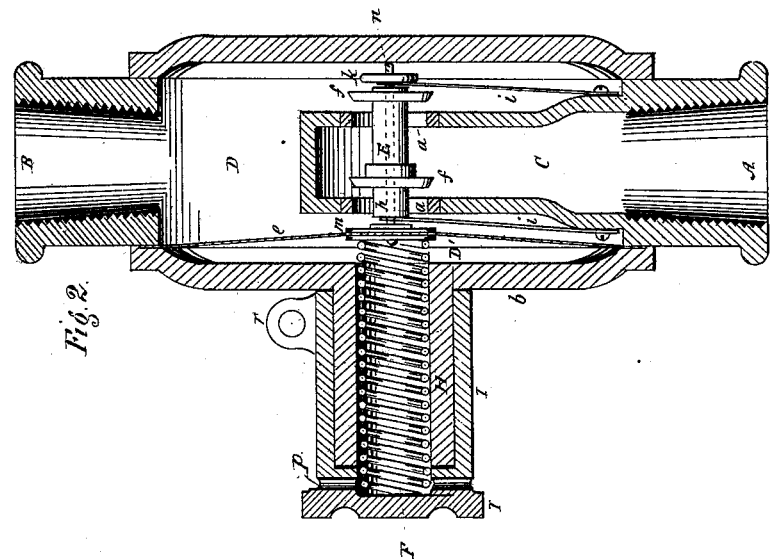
Witnesses:
Charles Harrison
Theodore Clark.
Inventor:
Moses G. Wilder
By his atty.
Wm. S. Thornton

UNITED STATES PATENT OFFICE.

MOSES G. WILDER, OF BROOKLYN, ASSIGNOR, BY MESNE ASSIGNMENTS, TO N. Y. GAS CONTROLLER CO., OF NEW YORK, N. Y.

IMPROVEMENT IN PRESSURE-REGULATORS.

Specification forming part of Letters Patent No. 220,202, dated September 30, 1879; application filed April 23, 1879.

*To all whom it may concern:*

Be it known that I, MOSES G. WILDER, of the city of Brooklyn, in the county of Kings and State of New York, have invented a new and useful Improvement in Pressure-Regulators; and I hereby declare the following to be a full, clear, and exact description thereof, reference being had to the accompanying drawings, making a part of this specification.

My invention relates to improvements in pressure-regulators for regulating the supply of gases and fluids under pressure, so as to diminish the supply under an increase of pressure, and to increase the supply when the pressure is again diminished.

It is more especially designed to be applied for regulating the pressure and supply of illuminating-gas, in which case my improved apparatus is attached to the meter, and operates so as to deliver the gas to the burners at a predetermined degree of constant pressure, which said degree of pressure is, by means of my invention, maintained at all times, whatever changes may occur in the degree of pressure under which the gas leaves the meter on its way to the burners; but, as before stated, it is applicable for other similar purposes, and to other kinds of apparatus in which it is necessary or desirable to regulate the supply of gases or fluids under pressure, so as to increase the supply under diminished pressure and diminish the supply under increased pressure.

The invention consists in the combination of a balanced valve, constructed substantially as hereinafter described, with an inlet-chamber and an outlet-chamber, between which said chambers the said valve is interposed, by means of which construction and arrangement the valve is not acted upon by the varying pressure of the gas in such a manner as to increase or diminish the tension upon the diaphragm, but is balanced and remains in equilibrium in any position necessary to deliver more or less gas at a constant pressure; also, in improved means for suspending or sustaining the said valve and adjusting the same in relation to the said inlet and outlet chambers, so that it will move freely and without friction in any position of the instrument, whether perpendicular, horizontal, or otherwise; also, in improved means for connecting the said valve, constructed as hereinafter described, with the diaphragm, so that the valve and diaphragm will coact in proper manner, but at the same time are not rigidly connected, and are rendered capable of adjusting themselves to each other in case the diaphragm should slightly change its form by long-continued use; and, further, in the combination of parts, as hereinafter specifically set forth.

In the accompanying drawings, Figure 1 represents a front elevation of my improved pressure-regulator, parts thereof being broken away to show the interior arrangements, and Fig. 2 is a vertical transverse section of the same on the line $x\ x$ in Fig. 1.

Similar letters of reference indicate the same parts in both the figures.

A is the inlet, which is connected to the meter or to the service-pipe through which the gas or fluid is supplied. B is the outlet, at the other end of the instrument, through which the gas passes on its way to the place or point of consumption. C is an inlet-chamber, into which the gas or fluid first enters, and in the sides of which, at its farther end, the valve-seats $a$ are located. D is an outlet-chamber of the instrument, into which the gas or fluid enters through the valves from the chamber C. E is a balanced valve interposed, as just stated, between the chambers C and D. This valve is composed, preferably, of two disks, $f f$, fitted and secured upon a hollow stem, $h$, one of the said disks or plugs fitting to its seat on the inside and the other on the outside of the chamber C.

A rod or pin, $n$, passes loosely lengthwise through the stem $h$, one end of the said rod being provided with screw-threads and a screw-nut, $k$, by which latter the valve is adjusted, and its other end being secured to two plates or washers, $m$, between which the center of the diaphragm $e$ is clamped.

The diaphragm may be of thin sheet metal, leather, or other suitable material, and may be clamped at its edges between the body of the instrument and the outer shell, $b$, as shown in the drawings, or in any other suitable manner.

The valve E is mounted upon two parallel vibrating carriers, $i\ i$, the lower ends of which are secured to the sides of the chamber C. These carriers are of thin sheet metal, and allow the valve to move freely to and from its seat, but at the same time prevent any sidewise or lateral motion of the valve.

F is a spring which bears against the outermost of the plates $m$, acting in a direct line with the line of motion of the valve E, and being located in a hollow arm, H, secured to or forming part of the outer shell or plate, $b$, of the instrument. This spring is removable, and a stronger or weaker spring may be inserted, according to the average degree of pressure under which the gas or fluid enters the instrument, and is so adjusted that when the pressure on the gas or fluid entering the instrument rises above the degree for which it is adjusted it will be pushed back by the pressure of the gas upon the diaphragm, and thereby partially or wholly close the valve, according to the degree of pressure to which it is subjected. In other words, a spring of such strength is employed as will remain passive under a certain predetermined degree of pressure, but will begin to recede whenever that degree of pressure is exceeded.

I is a cap which fits over the arm H, the head of which forms a bearing for the other end of the spring F, and which can be adjusted so as to increase or diminish the tension of the spring. $r$ is a clamping device, by which the said cap is secured upon the arm H; but, if preferred, it may be fitted upon the same by means of screw-threads. $p$ is a small opening through which the outer air is freely admitted into the air-chamber $D'$.

By means of my improvements, as above described, the valve is not acted upon by the varying pressure so as to increase or diminish the tension upon the diaphragm, but remains evenly balanced to deliver more or less gas at the constant pressure; also, the valve is suspended and sustained in relation to the valve-seat so that it will move freely and without friction, and also without being affected in its operation by change of position of the regulator; and the mode of attaching the valve to the diaphragm insures the valve resting fairly upon its seat, and prevents any disarrangement of the same by reason of the diaphragm changing its form by continued use.

What I claim as my invention is—

1. In a pressure-regulator, the balanced valve E, composed of the two disks $ff$, fitted upon the hollow stem $h$, and made adjustable by the screw-nut $k$, in combination with the rod $n$, the inlet-chamber C, and outlet-chamber D, as and for the purpose set forth.

2. The combination of the balanced valve E, constructed as described, with the carriers $i\,i$, rod $n$, and chambers C and D, as and for the purpose set forth.

3. The valve E, composed of the two disks $ff$, fitted upon the hollow stem $h$, in combination with the rod $n$, screw-nut $k$, and diaphragm $e$, as and for the purpose set forth.

4. The combination of the spring F, valve E, composed of the disks $ff$ and hollow stem $h$, diaphragm $e$, parallel carriers $i\,i$, rod $n$, and chambers C and D, as shown and described.

MOSES G. WILDER.

Witnesses:
A. H. OSBORN,
JOHN S. THORNTON.